3,390,954
HYDROXYLAMINE

Abraham H. de Rooij, Geleen, and Pierre A. M. Aggenbach, Brunssum, Netherlands, assignors to Stamicarbon N.V., Heerlen, Netherlands
No Drawing. Filed Oct. 4, 1965, Ser. No. 492,848
Claims priority, application Netherlands, Oct. 8, 1964, 6411684
5 Claims. (Cl. 23—50)

The present invention relates to a process for the preparation of an acid solution of hydroxylamine salt.

In the past, hydroxylamine has been produced by reducing nitrous acid with hydrogen. For instance, in United States Patent No. 2,414,142 a process is proposed for the preparation of hydroxylamine in which nitrous acid—formed in situ by the reaction of an alkali nitrite with an acid—is reduced to hydroxylamine with the aid of molecular hydrogen and in the presence of a catalyst containing a metal of the platinum group. No mention is made of the yields which can be obtained. Our attempt to reproduce the patented process by actual experimentation has proved, however, that the hydroxylamine yield is low and, furthermore, that the presence of an alcohol in the reaction medium—disclosed as merely optional in the patent—is an essential requirement for the formation of hydroxylamine.

In Table I below, there are shown the results of several experiments in which nitrous acid formed in situ was reduced with the aid of molecular hydrogen in the presence of a palladium catalyst under varying conditions.

Those experiments were carried out using a solution of sodium nitrite and a solution of sulfuric acid. The catalyst consisted of 5% of palladium or activated carbon as a carrier. The palladium concentration was between 720–900 milligrams per liter of reaction liquid. The reaction temperature was maintained at 25° C.

not formed by reduction of nitrous acid but, in fact, is mainly formed by the reduction of the nitrite ester which is immediately formed in situ in the reaction medium by a reaction of the alcohol with the released nitrous acid. It has been well known that ester-forming reaction between an alcohol and nitrous acid is rather rapid.

The present invention resides in the discovery that an improved process for the preparation of hydroxylamine may be achieved wherein a nitrite ester is supplied as such to an acid medium and is reduced by catalytic action therein. It has also been found that the yield of the hydroxylamine may be greatly increased by the method of the present invention.

The nitrite ester may be obtained, for example, by adding together the alcohol, an alkali nitrite and a strong acid, e.g., hydrochloric acid or sulfuric acid, and subsequently distilling the resulting ester from the reaction mixture. This method of obtaining the nitrite ester also produces, however, an equivalent amount of an alkali salt as a by-product along with the ester (compare U.S. Patent No. 2,414,142).

A more preferred process for preparing the nitrate ester would be one which eliminates the formation of a by-product. This invention further utilizes such as process in which the ester is formed by reacting the alcohol with nitrosyl sulfuric acid—as described, for instance, in U.S. patent application No. 434,545 filed Feb. 23, 1965. In this process, after the ester has been removed, the remaining sulfuric acid can be used again for the preparation of nitrosyl sulfuric acid. In the process of the reduction of nitrite esters to hydroxylamine, alcohol from the ester is released. This released alcohol can be continuously removed from the reaction medium by distillation and be used again in the preparation of the nitrite ester. In such a distillation of the reaction mixture, the evaporating alcohol aids in controlling the heat of reaction.

TABLE I

| Experiment No. | Reaction Conditions | Percentages of supplied nitrite reduced to— | | |
|---|---|---|---|---|
| | | Hydroxylamine | $NH_3$ | $N_2O+N_2$ |
| 1 | 250 ml. of a solution containing 0.5 mole of $NaNO_2$ was added to 250 ml. of a solution containing 0.5 mole of $H_2SO_4$ in about 3 hrs. | | 54 | 46 |
| 2 | 250 ml. of a solution containing 0.5 mole of $NaNO_2$ was added to a solution containing 0.5 mole of $H_2SO_4$ and 10% by weight of methyl alcohol in about 3 hrs. | 10.6 | 19.4 | 70 |
| 3 | 250 ml. of a solution containing 0.55 mole of $H_2SO_4$ and ethyl alcohol were added, in about 3 hrs., to 250 ml of suspension of 0.5 mole of $NaNO_2$ in ethyl alcohol so that at the end of the experiment the mixture contained about 70% by weight of ethyl alcohol. | | 56.7 | 43.3 |
| 4 | 250 ml. of a solution containing 0.5 mole of $NaNO_2$ and 250 ml. of a solution containing 0.55 mole of $H_2SO_4$ were dropped, simultaneously and separately, into ethyl alcohol. At the end of the experiment the reaction mixture contained 90% by weight of ethyl alcohol. | 18.8 | 8.6 | 72.6 |
| 5 | 250 ml. of a solution containing 0.5 mole of a $NaNO_2$ and 250 ml. of a solution containing 0.55 mole of $H_2SO_4$ were dropped, simultaneously and separately, into methyl alcohol. At the end of the experiment the reaction mixture contained 85% by weight of methyl alcohol. | 12.0 | 6.2 | 81.8 |

The results of these experiments indicate that:

(a) An excess of a strong acid must be present in the reaction medium: Experiment 3, in which the acid supplied to the medium immediately disappears, does not yield any hydroxylamine. The nitrite is only reduced to ammonia and nitrous oxide;

(b) The presence of alcohol is also essential: in Experiment 1, which is carried out in the absence of alcohol, no hydroxylamine is obtained;

(c) Even when the conditions mentioned under (a) and (b) are satisfied, the yield of hydroxylamine will remain low when compared to the amount of nitrous acid reacted.

These results now suggest that the hydroxylamine is

Preferably, the process according to the invention uses a methyl nitrite or ethyl nitrite ester since these esters are normally in the gaseous state and can be readily supplied to the reaction medium at the ambient temperature. Moreover, the methyl or ethyl alcohol formed in the reaction are easily removed from the resultant hydroxylamine solution by distillation due to their low boiling points.

The reduction of the nitrite ester must be carried out in an acid medium. By preference, a mineral acid, e.g. sulfuric acid, phosphoric acid or ammonium bisulfate is used for preparing the acid medium. The hydroxylamine acid salt solution produced according to the invention can then be used directly in subsequent reactions such as in the preparation of oxime.

Suitable catalysts to be used in the reduction of the nitrite ester to hydroxylamine are, in general, the well known so-called noble metal hydrogenation catalysts generally used supported on a carrier. Those hydrogenation catalysts which contain a noble metal of the platinum group are particularly preferred, especially platinum and palladium.

The most suitable catalyst to be used for this purpose is platinum applied to a carrier. With this catalyst, the minimum amount of by-products, such as ammonia and nitrous oxide, are formed in the reduction. The preferred carriers are activated carbon and alumina.

The reaction is exothermic and the temperature of the reaction medium may be kept at a constant level by cooling. A temperature of about 25° C. has been found to be particularly suitable, but it has also been found possible to carry out the reduction process at a temperature which is some tens of degrees below or above this level, e.g. from about 0° C. to about 60° C. It should be borne in mind, however, that a low reaction temperature has an adverse effect on the reaction rate and that at a high reaction temperature there is the danger that the catalyst will dissolve in the acid medium. In addition, the selectivity of the catalyst will be unfavorably affected by very high reaction temperatures—that is to say, more $NH_3$ and $N_2O$, and less hydroxylamine will be formed in the reduction reaction.

In order to minimize the formation of by-products such as $NH_3$ and $N_2O$ in the reduction reaction, it is important to reduce the nitrite ester as quickly as possible. This can be accomplished, in part, by providing a sufficient amount of catalyst, e.g. from 100–3000 milligrams of palladium per liter of reaction liquid, in the reaction medium. In addition, by controlling the supply of the ester and, if necessary, by rapidly and uniformly distributing the introduced ester throughout the reaction medium by vigorous stirring, conditions are created under which the ester is almost immediately reduced. As a result of this speedy reduction of the ester, the contact between the newly formed hydroxylamine and the nitrite ester is limited as much as possible. When the reduction reaction proceeds at a slow rate, the contact between the hydroxylamine and the nitrite ester is prolonged and, as a result, more by-products are likely to be formed. Table II, below, presents a summary of the results of experiments in which, in a reaction vessel provided with a cooling jacket, the catalyst was suspended in 150 cm.³ of water and the suspension stirred for half an hour. Thereafter, the volume was adjusted to 500 cm.³ with a dilute acid solution either with or without alcohol. Subsequently, hydrogen in excess was introduced, as by a bubble-tube, and the nitrite ester was gradually supplied. During the experiments some samples of the evolving gas were obtained, which were analyzed by the mass-spectrographic method. It was found that none of these gaseous samples contained any nitrite ester, and that nitrous oxide had, in all cases, been formed by reduction of the ester. After completion of the experiments, and after filtration of the catalyst, the hydroxylamine content and the ammonia content of the reaction liquid were then ascertained.

TABLE II

| Experiment No. | Reaction Conditions | Percentages of supplied nitrite reduced to: | | |
|---|---|---|---|---|
| | | Hydroxylamine | $NH_3$ | $N_2O+N_2$ |
| 6 | Reaction medium: 2 moles of $CH_3COOH$ Catalyst: 5% Pd on carbon (in an amount of 900 milligrams of Pd per liter of reaction liquid). Rate of supply of methyl nitrite ester: 500 millimoles per 3 hours. Temperature: 25° C. | 7 | 13.5 | 79.5 |
| 7 | Same as in Experiment 6, with the difference that, instead of $CH_3COOH$, 2 moles of $H_3PO_4$ were used. | 46.1 | 10.5 | 43.4 |
| 8a | Same as in Experiment 6, with the difference that, instead of $CH_3COOH$, one mole of $H_2SO_4$ was used. | 58.0 | 16.8 | 25.2 |
| 8b | Same as in Experiment 8a, but here the reaction liquid also contained 25 cm.³ of methyl alcohol. | 64.0 | 14.0 | 22.0 |
| 8c | Same as in Experiment 8b, with the difference that 2,400 milligrams of Pd were used per liter of reaction liquid. | 62.4 | 22.2 | 15.4 |
| 9 | Same as in Experiment 8b, with the difference that, instead of Pd on Carbon, Pd on $Al_2O_3$ was used as catalyst. | 24.6 | 4.0 | 71.4 |
| 10 | Same as in Experiment 8b, with the difference that, instead of Pd on Carbon, Pt on C was used as catalyst. | 56.6 | 28.8 | 14.6 |
| 11 | Same as in Experiment 8b, with the difference that the reaction temperature was 0° C. | 40.0 | 8.2 | 51.8 |
| 12 | Same as in Experiment 8b, with the difference that the reaction temperature was 60° C. | 46.6 | 22.3 | 31.1 |
| 13 | Same as in Experiment 8b, with the difference that, instead of one mole of $H_2SO_4$, 2 moles of $NH_4HSO_4$, were used. | 55.4 | (¹) | (¹) |
| 14 | Same as in Experiment 8b, with the difference that the rate of supply was 380 millimoles in 6 hrs. | 69.0 | 23.0 | 8.0 |
| 15 | Same as in Experiment 14, with the difference that Rh on carbon was used as catalyst. | | 96.5 | 3.5 |
| 16 | Same as in Experiment 8b, with the difference that the reaction liquid contained 25 cm.³ of ethyl alcohol and the introduced nitrite ester was ethyl nitrite ester | 33.0 | 29.2 | 37.8 |
| 17 | Same as in Experiment 8b, with the difference that the reaction liquid contained 275 cm.³ of methyl alcohol. | 42.6 | 20.0 | 37.4 |
| 18 | Reaction medium: one mole of $H_2SO_4$ and 250 cm.³ of butyl alcohol. Catalyst: 2% Pd on Carbon (in an amount of 720 milligrams of Pd per liter of reaction liquid). Rate of supply of butyl nitrite ester dissolved in butyl alcohol: 500 millimoles in 3 hours. Temperature: 25° C. | 13.6 | 7.7 | 78.7 |

¹ Not ascertained.

Comparison of the results of Experiments 6, 7 and 8 shows that in a sulfuric acid medium and in a phosphoric acid medium much higher yields are obtained than in an acetic acid medium, thus demonstrating the value of a mineral acid. In a phosphoric acid medium the selectivity of the reduction is slightly higher, while in a sulfuric acid medium the activity of the catalyst is greater. In an acetic acid medium both the activity and the selectivity are low. It is emphasized that in a non-acid medium the reduction of the nitrite ester leads exclusively to the formation of $NH_3$ and $N_2O$.

The results of Experiments 8, 9, and 10 show that a catalyst consisting of Pd or Pt on carbon has a much higher activity than a catalyst applied to an $Al_2O_3$ carrier. A strong increase of the catalyst concentration gives rise to increased $NH_3$ formation (Experiment 8c).

Comparison of the results of Experiments 11 and 12 with those of Experiment 8b gives some indication as to the influence of the reaction temperature. A lowering of the temperature causes a decrease of the catalyst activity, but an increase of the selectivity.

The results of Experiment 14 show that an increase of the rate of supply gives rise to increased $NH_3$ formation, while those of Experiment 15 prove that rhodium on a carbon carrier is not a suitable catalyst for the production of hydroxylamine, as virtually all of the nitrite ester is reduced to $NH_3$.

The greater part of the results given in Table II refers to the reduction of the methyl nitrite ester. Instead of this ester, however, the nitrite esters of other alcohols may be used to prepare hydroxylamine (see e.g. the results of Experiments 16 and 18). However, as the results of the experiments indicate the application of alcohols containing not more than 2 carbon atoms is much preferred.

Comparison of the experimental results given in Table II with those of Table I makes it clear that the process according to the invention, in which the nitrite ester is supplied to the reaction medium, gives better results than the known process, in which the nitrite ester is formed in the reaction medium.

A further advantage of the process according to the invention is that it does not involve a separation as is required in the known process between the resulting hydroxylamine salt and the alkali salt produced as a by-product of the formation of nitrous acid.

The invention has been described in detail, with reference to preferred embodiments thereof, but it should be understood, however, that variations and modifications can be made within the spirit and scope of the invention.

What is claimed is:

1. A process for preparing hydroxylamine comprising suspending a noble metal hydrogenation catalyst in an aqueous mineral acid medium, introducing molecular hydrogen into said acid medium and then gradually adding a nitrate ester of methanol or ethanol into said acid medium and reducing said nitrite ester, at a temperature from about 0° to about 60° C., to hydroxylamine or a salt thereof.

2. A process according to claim 1 wherein said hydrogenation catalyst is selected from the group consisting of palladium and platinum.

3. A process according to claim 1 wherein said acid medium is prepared from a member selected from the group consisting of sulfuric acid, phosphoric acid and ammonium bisulfate.

4. A process according to claim 1 further comprising distilling the alcohol formed by said reduction reaction from said acid medium.

5. A process according to claim 1 wherein said hydrogenation catalyst is palladium on a carbon carrier and present in an amount of about 100–3000 mg. of palladium per liter of reaction medium, said nitrate ester is added at a rate of 0.12 to 0.40 gram mole per hour per liter of reaction medium, and said reduction reaction is carried out at a temperature of from about 0° to about 60° C.

References Cited

UNITED STATES PATENTS 2,307,929  1/1943  Joyce _____ 23—87

FOREIGN PATENTS 960,459  6/1964  Great Britain.
1,061,537  4/1954  France.

OSCAR R. VERTIZ, *Primary Examiner.*

H. S. MILLER, *Assistant Examiner.*